3,806,473
POLYURETHANE FOAMS BASED ON LIQUID
POLY(ε-CAPROLACTONE)POLYESTER POLYOLS
Frank G. Lombardi, Clifton, Fritz Hostettler, Verona, and William H. Cook, Upper Montclair, N.J., assignors to Inter-Polymer Corporation, Passaic, N.J.
No Drawing. Original application Aug. 14, 1968, Ser. No. 752,513. Divided and this application July 29, 1971, Ser. No. 167,496
Int. Cl. C08g 22/46, 41/04
U.S. Cl. 260—2.5 AN    17 Claims

ABSTRACT OF THE DISCLOSURE

Flexible polyester-urethane foams having excellent humid aging properties, ability to be flame-laminated and to withstand dry-cleaning solvents, prepared by reacting liquid polyesters containing about 10 percent to 72 percent by weight of the epsilon-oxycaproyl unit

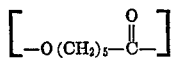

with an organic polyisocyanate, water and optionally, other blowing agents, a catalyst and a surfactant, and processes for their preparation.

Liquid polyesters having a hydroxyl equivalent of from about 800 to about 1400, by reaction of about 10 to 72 percent by weight of epsilon-caprolactone, or alternatively about 12 to 80 percent by weight of a mixture of 6-hydroxycaproic acid and its lower oligomers, with from about 90 to about 28 percent by weight of a mixture comprising reacted segments of an organic dicarboxylic acid, an alkylene glycol and a triol such as trimethylolpropane, and processes for their preparation.

---

This application is a division of our application Ser. No. 752,513, filed Aug. 14, 1968.

BACKGROUND OF THE INVENTION

Field of the invention

This invention relates to the manufacture of flexible, cellular polyurethanes and in particular to the manufacture of such polyurethanes by the reaction of a reaction product of a liquid polyester containing from 10% by weight to 72% by weight of the epsilon-oxycaproyl unit, water or other blowing agent, and an organic polyisocyanate, and the products produced thereby. This invention also relates to processes for production of the liquid polyester intermediates employed in production of the polyurethanes.

DESCRIPTION OF THE PRIOR ART

It is well known that poyesters prepared from dicarboxylic acids and glycols in combination with small quantities of triols such as trimethylolpropane, water, and organic polyisocyanates such as 2,4- and 2,6-toluene diisocyanates yield commercially useful polyurethane foams. A desirable prerequisite for commercial operations in the production of such foams consists in the use of polyesters which are liquid at room temperature in order that these materials may be transferred and mixed under ambient conditions of temperature and at moderate pressures. The equivalent weight of the desirable commercial polyester products to be employed in such processes is within the range of about 800 to about 1400, said equivalent weight being based upon the available terminal hydroxyl and carboxyl groups. Generally speaking, such products are predominantly terminated with primary hydroxyl groups. The polyester products which are of most commercial significance in this area at the present time are those comprising the reaction products of adipic acid, diethylene glycol and a small amount (1–3 percent based on the total charge by weight) of trimethylolpropane. Polyester-urethane foams based upon the above polyester ingredients, 2,4- and 2,6-toluene diisocyanate mixtures, and water as the blowing agent, yield very useful commercial products for many applications. Such applications are for example the production of cloth interlinings, upholstered goods, novelty articles, and many other commercial applications. Although these foams have many desirable properties such as high strength to weight ratio, good adhesion to a variety of adhesives, are capable of being flame-laminated to cloth, are resistant to dry-clean-fluids, etc., they are deficient with regard to their ability to withstand exposure to moist atmosphere both at lower and elevated temperatures. In this regard they are much inferior to the urethane foams prepared from polyethers. However, the latter are deficient in their ability to be flame-laminated or to withstand dry-cleaning fluids.

Another class of polyester-urethanes which are potentially useful in these areas are those derived from copolyesters of epsilon-caprolactone and alkyl-substituted epsilon-caprolactones described for example in U.S. Pat. No. 2,990,379. The liquid polyesters described in this patent yield useful polyurethane foams which exhibit superior resistance toward exposure to moist atmosphere. However, in order to obtain liquid polyesters, such polyesters must contain substantial quantities of alkyl-substituted epsilon-caprolactones with the net result that such compositions are expensive due to the unavailability or high costs of the alkyl-substituted monomers.

Still another method for the manufacture of flexible polyester foams from liquid polyesters is described in U.S. Pat. No. 2,962,455, which describes the manufacture of polyurethane foams from liquid polyester comprising reaction products of epsilon-caprolactones and ethylene oxide. However, probably because of the relatively high ethyleneoxy content of these foams, they are also deficient toward exposure to moist atmosphere.

Consequently, there exists a definite need in the art for flexible polyester-urethane cellular products which exhibit the high strength to weight ratio of the so-called adipate foams, the ability to be flame-laminated and the ability to withstand dry-cleaning solvents, while at the same time exhibiting superior performance characteristics when exposed to humid atmosphere over a relatively wide temperature range. Moreover, it is, as stated, a prerequisite in the production of such foams that the polyesters utilized in preparing such products be liquid in order to be useful on the present machine-foaming equipment utilized to manufacture flexible polyester urethane foams.

SUMMARY OF THE INVENTION

It is accordingly one object of the present invention to provide a process for the manufacture of liquid, substantially hydroxyl-terminated polyesters which contain from 10% by weight to about 72% by weight of the epsilon-oxycaproyl unit.

A further object of the invention is to provide novel polyester-urethane foams possessing improved resistance toward exposure to moist atmosphere, comprising reacting liquid, substantially hydroxyl-terminated polyesters which contain from 10 to 72% by weight of the epsilon-oxycaproyl unit, an organic polyisocyanate and a blowing agent.

A still further object of the present invention is to provide a process for the manufacture of novel polyester-urethane foams possessing improved resistance toward exposure to moist atmosphere, comprising foaming an admixture of (a) a liquid substantially hydroxyl-terminated polyester which contains from 10 to about 72% by weight of the epsilon-oxycaproyl unit, (b) a mixture of 2,4- and 2,6-toluene diisocyanates, (c) water and optionally, additional blowing agents, (d) one or more catalysts capable of accelerating the reaction and (e) a surfactant capable of stabilizing the foaming mixture, and the products produced thereby.

Other objects and advantages of the present invention will become apparent as the description thereof proceeds.

In satisfaction of the foregoing objects and advantages there is provided by the process of this invention a procedure for the preparation of novel flexible polyurethane foams having improved resistance toward exposure to moist atmosphere, which comprises reacting a substantially hydroxyl-terminated polyester containing from about 10 percent by weight to about 72 percent by weight, and preferably from about 30 percent by weight to about 70 percent by weight of the epsilon-oxycaproyl unit, an organic polyisocyanate and water and optionally other blowing agents in the presence of a catalyst or catalyst mixture capable of accelerating the reaction and a surfactant capable of stabilizing the foaming mixture, and the novel foams produced thereby.

The preferred liquid, hydroxyl-terminated polyesters utilized in the present process are those having a hydroxyl equivalent of from about 800 to about 1400, and comprises a reaction product of about 30 to about 70 percent by weight of epsilon-caprolactone, or alternatively about 35 percent to about 80 percent by weight of a mixture of 6-hydroxycaproic acid and its lower oligomers, and from 70 percent by weight to about 30 percent by weight of a mixture comprising reacted segments of a dicarboxylic acid, an alkylene glycol and a small amount of a triol such as trimethylolpropane and the like.

DESCRIPTION OF THE PREFERRED EMBODIMENTS

In accordance with the present invention, it has been found that the above-described procedures result in the production of flexible polyester-urethane cellular products having excellent, and in several cases superior, properties as compared with those produced by prior art procedures. In particular, the resistance of the foams prepared according to this invention toward exposure to moist atmosphere is greatly improved. As indicated, the essence of the invention resides in the discovery that in order to improve the resistance of these foams toward exposure to moist atmosphere, the polyester portion of the foams must contain substantial portions of the epsilon-oxycaproyl unit. A further important feature of the invention resides in the proper selection of a surfactant which will stabilize the foaming mixture. Surfactants of this type comprise, for example, block-copolymers of polysiloxane oxyalkylene blocks, wherein the oxyalkylene blocks are comprised of oxyethylene units, or of coploymer units comprising oxyethylene-oxypropylene units, oxyethylene-oxybutylene units, or oxyethylene-oxypropylene-oxybutylene units.

A second aspect of the invention consists of a process for the manufacture of the above polyester-urethane foams.

A still further aspect of the invention consists of a process for the manufacture of liquid polyester products containing from 10 percent to about 72 percent by weight, preferably from about 30 percent to about 70 percent of the epsilon-oxycaproyl unit.

In the manufacture of the polyester intermediate for use in this invention a mixture consisting of from 10 percent by weight to about 72 percent by weight of epsilon-caprolactone, a dicarboxylic acid, highly preferably adipic acid, a glycol, highly preferably diethylene glycol and a small portion of a triol or tetrol, highly preferably trimethylolpropane, are reacted at a temperature from about 100° C. to as high as 300° C., preferably from 100 to about 250° C., if desired in the presence of a catalyst, to form a substantially hydroxyl-terminated polyester having a hydroxyl equivalent weight of from about 800 to about 1400. It is also within the scope of the present invention to replace the epsilon-caprolactone with about 12 to 80 percent by weight of a mixture of 6-hydroxycaproic acid and its lower oligomers. Various methods for the preparation of such oligomers are further described in copending U.S. application Ser. Nos. 715,139 and 715,164, filed Mar. 22, 1968. In the above condensation reaction, water is formed during the reaction and may be conveniently removed by distillation at atmospheric or reduced pressure, or by azeotropic distillation with a suitable hydrocarbon such as benzene, toluene, ethyl benzene, xylene, and the like.

The polyesters of the present invention must remain liquid at temperatures of from about 20° C. or lower to an upper temperature limit of about 30° C., in order that they may be transferred and mixed readily in conventional machine-foaming equipment. However, by this statement it is not meant to imply that the initial temperature of the liquid polyester component should be limited to a temperature range of from 20° to 30° C., but it is intended to mean that within this temperature limit, optimized foaming performance for many applications, such as the foaming of continuous urethane blocks, or of foamed cylinders, is obtained. On the other hand, a polyester which liquified at a temperature above about 30° C. is not particularly desirable since reaction rates with such systems become impractical. Thus, a hydroxyl-terminated homopolyester prepared from a glycol and epsilon-caprolactone, at the hydroxyl equivalent weight range of from 800 to 1200, melts at around 60° C., and the resulting polyester presents unacceptable processing problems. Moreover, foams from such homopolyesters, while flexible initially, will harden or crystalize on standing even at room temperature, a characteristic which makes them essentially useless for the majority of applications now practiced for flexible polyester urethane cellular products.

For the above reasons, the upper content of epsilon-oxycaproyl units in the polyesters of the present invention are quite critical and have been observed to be around 72% by weight on the system epsilon-caprolactone, dicarboxylic acid, alkylene glycol, and small quantities of triols or tetrols. Whereas with other combinations of epsilon-caprolactone (for the oligomer mixtures of 6-hydroxycaproic acid), dicarboxylic acid, glycols, and minor quantities of triols or tetrols, the upper limit of allowable epsilon-oxycaproyl units by weight may be somewhat different, it is still within the scope of the invention to utilize such combinations, as long as the melting point of the resulting polyester product is not above about 30° C., and the epsilon-oxycaproyl content is not above about 72 percent by weight.

The lower limit of the epsilon-oxycaproyl units is governed by the improvement of the hydrolytic stability of the liquid polyesters or polyester-urethane foams imparted thereto by the presence of said epsilon-oxycaproyl units. Surprisingly, it has been found that a significant improvement is observed at an epsilon-oxycaproyl content of only about 10 percent by weight based upon the total weight of the polyester. It is obvious therefore from the foregoing discussion, that a relatively high content of epsilon-oxycaproyl units, for example, from about 30% by weight to about 72% by weight is still more highly preferred in order to enhance the hydrolytic stability of the polyesters, and of the foamed polyester-urethane products produced therefrom. In this connection it should be emphasized that the hydrolytic stability of the polyester-urethane foams which contain up to 72 percent by weight of epsilon-oxycapropyl units in the polyester molecule can be even further improved by the addition of small quantities of monomeric or polymeric carbomiimides to the foaming mixture. Similar observations hold true with the products containing less than 72 percent by weight of the epsilon-oxycaproyl units.

In the manufacture of the polyester reactants of the present invention, the lactones which may be employed comprise epsilon-caprolactone and the lower alkyl-substituted epsilon-caprolactones (one or two alkyl groups). Epsilon-caprolactone is however, highly preferred. In place of the epsilon-caprolactones, it is also feasible to utilize oligomer mixtures of 6-hydroxycaproic acids as indicated above in amounts of 12 to 80% by weight. Of these reactants the oligomer mixture of 6-hydroxycaproic acid per se is highly preferred.

A variety of dicarboxylic acids such as succinic and glutaric acid or their anhydrides, adipic acid, pimelic acid, azelaic acid, and sebacic acid as well as mixtures thereof may be utilized in the manufacture of the polyester segment. However adipic acid is highly preferred as it is readily available.

A number of glycols may also be used in the polyester preparation. Among the glycols which deserve particular mention are ethylene glycol, propylene glycol, diethylene glycol, dipropylene glycol, 1,3-butylene glycol, neopentylene glycol and the like. In order to obtain high strength foams and yet obtain liquid polyesters however, diethylene glycol is highly preferred.

The polyesters described above for the preparation of the flexible polyurethane foams are also preferably slightly branched. This is accomplished by admixing small amounts, for example about 0.1 to 5 percent based on the total charge of reactants in the polyester reaction, and preferably from about 1 to 3 percent based on the total charge of reactants in the polyester reaction, of a triol or tetrol during the polyesterification reaction. Triols and tetrols of the type useful for this purpose include glycerol, 1,2,6-hexanetriol, trimethylolpropane, pentaerythritol, alpha-methylglucoside, and others. Trimethylolpropane is highly preferred for this purpose as it provides good results and is readily available.

In the manufacture of the flexible polyester-urethane foams, the selection of the proper polyester depends upon the functionality of the final product, its molecular weight, and its hydroxyl and carboxyl content. It is usually desirable to keep the carboxyl content as low as possible, for example at a value of 2 or below. With the moderately branched polyesters of the present invention, the hydroxyl value range of the useful polyester products varies from about 40 to about 70, corresponding to a hydroxyl equivalent range of from about 800 to about 1400.

The manufacture of the polyester may be conducted in the presence or absence of a catalyst. If it is desirable to utilize a catalyst, conventional polyesterification and ester interchange catalysts may be employed in quantities from as low as 5 parts per million and lower, based upon the total weight of reactants, to as high as about 0.3 percent, based upon the reactant amounts. A preferred range is from 5 to 1000 parts per million, based upon the reactants. Typical catalysts which are eminently suitable in conducting this process are tetraalkyl titanates such as tetraisopropyl and tetrabutyl titanates, stannous acylates such as stannous octoate and stannous oleate, lead acylates such as lead 2-ethylhexoate and many other compounds known to catalyze polyesterification reactions. As pointed out, it is also within the scope of the invention to perform the polycondensation reaction in the absence of a catalyst, which is at times desirable since it is known that metallic residues in the polyesters have a significant effect upon the catalysis of the subsequent reactions of the polyesters with the polyisocyanates to produce the polyurethane foams.

The polyesterification reaction is conventionally conducted at a temperature range of from about 100° C. to about 300° C., preferably from about 100° C. to about 250° C., for periods sufficient to lower the carboxyl value to 5 or less, preferably to 2 or less. Reaction times of a few hours to as much as about 48 hours are normally sufficient to accomplish suitable reduction of the acid number. The reaction is preferably conducted in an inert atmosphere such as in the presence of nitrogen, methane, etc., to avoid discoloration of the resulting products.

By-product water of condensation can be removed by distillation under normal pressure, or under reduced pressure. Reduced pressure is often desirable to remove small amounts of water toward the end of the reaction. The pressure is conveniently reduced to a range of 20 mm. Hg or less. It is also within the scope of the invention to remove water of condensation by means of azeotropic distillation with solvents such as benzene, toluene, ethylbenzene, xylene, etc. After completion of the azeotropic distillation the solvent is removed by distillation and the reactants are then subjected to reduced pressure to remove all volatiles and additional small quantities of water if necessary.

In order to reach the desired hydroxyl value of the polyester, a small excess of glycol, usually in the range of 5 to 20% excess over the calculated amount, is charged in order to compensate for its losses during the distillation step. The exact amount of excess depends upon many variables such as reaction temperature, solvent employed if any, reduced pressure, type and design of reaction equipment, etc. Consequently, it is desirable to establish the required glycol excess in actual plant runs.

In the manufacture of the novel flexible polyester-urethane foams of the present invention the reaction leading thereto comprises reacting an admixture of (a) the liquid, substantially hydroxyl-terminated polyester which contains from 10 to about 72 percent by weight of the epsilon-oxycaproyl unit prepared as above, (b) organic polyisocyanates, (c) water, and optionally, additional blowing agents, (d) one or more catalysts capable of accelerating the reaction of isocyanates, and (e) a surfactant capable of stabilizing the foaming mixture.

The liquid polyester products of (a) have been described hereinabove. The organic polyisocyanates which are contemplated for use in the process of the present invention include 2,4- and 2,6-toluene diisocyanate or mixtures thereof, diphenylmethane diisocyanates and polymeric isocyanates of condensation products of formaldehyde and aniline or o-toluidine such as those described in U.S. Pats. Nos. 2,683,730 and 3,012,008. Thus such polyisocyanates are generally known to the art.

It is further within the scope of this invention to utilize mixtures of diphenylmethane diisocyanates in admixture with their carbodiimides. A commercial product mixture of this type found to be useful is sold under the trade name "Isonate" 143–L by the Upjohn Company.

Particularly useful organic diisocyanates for the purpose of the present invention comprises the mixture consisting of 65 percent by weight of 2,4-toluene diisocyanate and 35 percent by weight of 2,6-toluene diisocyanate, as well as the mixture consisting of 80 percent by weight of 2,4-toluene diisocyanate and 20 percent by weight of 2,4-toluene diisocyanate. Moreover, mixtures of the 80:20 isomer mixture and the 65:35 isomer mixture are also contemplated. The latter toluene diisocyanates are highly preferred for the purpose of practicing this invention.

Moreover, it is also within the scope of this invention to utilize mixtures of the toluene diisocyanates with the above-described diisocyanates or polymeric isocyanates derived from aniline and o-toluidine.

Foaming of these formulations can be accomplished by employing a small amount of water, for example from about 0.5 percent or less to about 3 percent or more by weight based on the total ingredients, or through the use of blowing or foaming agents which are vaporized by the exotherm of the isocyanate reaction, or by a combination of the water-blowing agent vaporization techniques. All of these methods are well known in the art. The preferred volatile blowing agents are certain halogen substituted aliphatic hydrocarbons which have boiling points of between about −40° C. and 70° C., and which vaporize at or below the temperature of the foaming mass. These blowing agents include by way of example, trichloromonofluoromethane, dichlorodifluoromethane, dichloromethane, 1,1 - dichloro-1-fluoromethane, dichlorodifluoromethane, dichloromethane, 1,1-dichloro-1-fluoroethane, and the like. Other useful blowing agents include low boiling hydrocarbons such as butanes, pentanes, hexanes, and the like as well as carbon dioxide. Preferred foaming agents are water and mixtures of water and the fluorinated compounds.

The amount of foaming agent used will vary with the density desired in the foamed flexible polyester-urethane product. In general, it may be stated that for 100 grams of the reacting foam mixture, about 0.01 mol or less to about 0.2 mol or more gas should be released to provide densities ranging from 20 to about 1.2 pounds per cubic foot, respectively. The generated gas may be carbon dioxide from the isocyanate-water reaction alone, if desired.

The catalyst materials employed in the foam formulation of this invention include tertiary amine catalysts, metallic catalysts, or combinations thereof, all being well known in the art. Particularly useful catalysts are mixtures of tertiary amines.

Among the many metallic catalysts which are useful in the present process, there may be mentioned particularly the organic tin compounds which are known in the art. Among other metallic catalysts which may be used and which are also known in the art, are compounds of lead, titanium, antimony, zinc, cobalt, iron, bismuth, and the like. Preferred metallic catalysts are tin compounds including stannous octoate, stannous oleate, dibutyltin di-2-ethyl hexoate, dibutyltin dilaurate, and the like.

The many tertiary amine catalysts which are useful for the purpose of the present invention include by way of example, N-methyl and N-ethyl morpholine, N-coco morpholine, N,N-dimethyl fatty alkyl amines such as Armeen DM-16 D and the like manufactured by Armour Industrial Chemicals, dimethylbenzylamine, 1-methyl-4-dimethylaminoethylpiperazine, N,N' - dimethylpiperazine, N-methyldiethanolamine, triethanolamine, tetrakis-N-2-hydroxypropylethylenediamine, triethylenediamine, 2,2'-oxybis (N,N-dimethylethylamine), N,N,N',N'-tetramethyl-1,3-butanediamine, 1,1,3,3 - tetramethylguandine and the like. Preferred tertiary amines are N-methyl and N-ethylmorpholine, N-coco morpholine, Armeen DM-16 D, and dimethylbenzylamine.

One or more teritary amines may be utilized in combination with metallic catalyst, for example a tin catalyst like stannous octoate, in providing a properly balanced promotion of the isocyanate-polyester and isocyanate-water reaction.

For the formation of a stable cellular network during the foaming process of the ingredients contemplated in the present invention, the use of a suitable foam stablizing surfactant is required. Surprisingly, it has been observed that the surfactants described in the prior art for the manufacture of "one-shot" flexible polyester foams do not in most cases lead to the desired result, but rather result in irregular cell structure containing a number of small cells intermingled with many cells of large diameter, or often also cause the foaming mass to contain splits and voids. Moreover, with many surfactants, the foams show a tendency to collapse before they reach full height.

Exceptions were observed however with some of surfactants described in the prior art for the manufacture of "one-shot" flexible polyester foams occurred during the foaming of polyester polyols when the polyester polyols contained from 10 to about 25% of the ϵ-oxycaproyl unit. Polyesters containing about 35% and higher of the ϵ-oxycaproyl unit did not give the desired results with the flexible polyester surfactants described in the prior art. Surfactants tested in the foaming of the liquid polyesters of the present invention, said polyesters containing from 12 percent by weight to 72 percent by weight of the epsilon-oxycaproyl unit, include Witco Foamrez 77–86 (Witco Chemical Company), Additive A–3 (Mobay Chemical Company), Witco Foamrez 1058 (Witco Chemical Company), Emulphor EL–719 (General Aniline Film Corporation), and Niax surfactant L–532 (Union Carbide Corporation). All these surfactants, which are highly recommended for the manufacture of flexible foams based on polyesters prepared from adipic acid, diethylene glycol and trimethylolpropane were not operative for the manufacture of good foams from the liquid, hydroxyl-terminated polyesters which contained upwards of about 35% of the ϵ-oxycapropyl unit, according to the present invention. These surfactants however may be used when the polyester contains about 10 to 25%, preferably 12 to 23% of the ϵ-oxycaproyl unit.

In addition, other conventional types of surface-active materials mentioned in the patent literature were found to be unsatisfactory in producing the foams of the present invention. Thus such known cell-size control agents (and stabilizers as polyoxypropylenepolyoxyethylene copolymers, nonylphenol-ethylene oxide adducts, alkoxy silanes, polysilylphosphonates, polydimethylsiloxanes, metal soaps and/or alkali metal sulfonates were found not to be operable as surfactants in producing the instant foams in commercially acceptable form.

Surprisingly it has been found that only certain polysiloxane-polyoxyalkylene block copolymer surfactants, which are not recommended for the conventional adipate polyester foams described hereinabove, produce excellent results when utilized in combination with the liquid polyester products of the present invention comprising polyester products cotaining from 35 percent to 72 percent by weight of the epsilon-oxycaproyl unit. Hence, it is to be understood that an important aspect of the invention resides in the use of the unique polyester/surfactant combination.

Thus the surfactant systems that have met with considerable success when employed in the process of the invention are those generally containing siloxane-oxyalkylene copolymers. The siloxane-oxyalkylene copolymers which show considerable promise are the linear and particularly the branched copolymers (block copolymers) of polymeric alkylene oxides (ethylene oxide, propylene oxide, butylene oxide) and polymeric dimethylsiloxanes. In addition, polysiloxane-polyoxyalkylene surfactants of the type produced from homopolymers of ethylene oxide as well as copolymers of ethylene oxide and propylene oxide are useful in forming foams of commercially acceptable cell structure according to the process of the present invention.

The function of cell-size control agents or surfactants in the production of commercially acceptable polyurethane foams has been studied a great deal. (see e.g. the article by R. J. Boudreau, Modern Plastics, vol. 44, No. 5, January, 1967, pages 133–135, 138, 143, 144, 147, 234, 239–240). In this article, as well as others, it is pointed out that the formation of a urethane foam begins with the intimate mixing of several reactants which are often mutually insoluble. The mixing is accompanied by the nucleation of gas bubbles and closely followed by the initiation of a complex series of chemical reactions.

While it is not always possible to correlate the specific composition of the surfactant with its ability to promote mixing of the foam components, nucleation, bubble stabilization, or cell opening, certain generalizations have been promulgated by the art with regard to the nature and activity of polysiloxane surfactant systems in polyurethane foam production. These generalizations are discussed by Boudreau, supra, substantially as follows:

(1) Dimethylpolysiloxanes lower the surface tension of polyurethane foam systems and promote bubble nucleation. The molecular weight (viscosity) of the silicone must be high enough (>5 cs.) to make the surfactant insoluble in the foam system. These surfactants do not provide bubble stabilization since they diffuse to the interface too rapidly for the Marangoni effect (surface layer diffusion from areas of lower to those of higher surface tension thus restoring the film to its original condition) to be operative. Consequently, the use of these surfactants is generally restricted to high viscosity prepolymer systems.

(2) Dimethylpolysiloxane-polypropylene oxides are not effective surfactants in either flexible or rigid foam systems. There is no doubt that the surface tension of a polyether triol is lowered by this type of copolymer, so that they might be expected to be effective nucleating agents. However, their water insolubility makes them poor emulsifiers for flexible formulations. In addition, such polymers may diffuse too rapidly to provide being bubble stabilization via the Marangoni effect.

(3) Dimethylpolysiloxane-polyethylene-oxides are not at all effective in flexible foam systems, yet they are the preferred surfactants for rigid foam systems. These copolymers do not lower the surface tension of polyether triols appreciably. This observation coupled with the fact that these surfactants can be used in conjunction with other surfactants to provide coarser celled foams suggests that nucleation is retarded just as it would be without any surfactant present.

(4) Dimethylpolysiloxane - polyethylene - polypropyleneoxides function effectively in both flexible and rigid foam systems based on polyethers. Properly formulated, they have the solubility characteristics needed to provide good emulsification; they lower the surface tension thus assuring good nucleation; and they have the necessary dynamic surface tension to provide bubble stability through film resilience. The available data indicate that an efficient surfactant for flexible foams must contain from 15 to 30% silicone; both the silicone component and the polyether should have a molecular weight greater than 1000; and the polyether should be approximately 50% ethylene oxide. It is also necessary that the silicone portion of the copolymer be incompatible with the urethane system, since changes that increase compatibility, such as substituting phenyl or ethyl for methyl, detract from performance. The empirical requirements concerning silicone to polyether ratio, molecular weight, and incompatibility, can all be thought of as controlling the ability of the copolymer to diffuse in the urethane system rapidly enough so that a low equilibrium surface tension will be attained, but not so rapidly as to inhibit the bubble stabilization through the Marangoni effect.

Contrary to these generalizations of the prior art, which have been made predominantly for polyether foam systems, it has been found according to the present invention that flexible foams may be produced as described herein employing liquid polyesters containing about 35 to 72 percent by weight of the epsilon-oxycaproyl unit, when used in combination with certain polysiloxane-polyoxyalkylene copolymer surfactants. Thus, while the several generally known surfactants mentioned hereinabove do not provide suitable foams, it has been found that excellent foams are produced, employing the polysiloxane-polyoxyalkylene copolymer surfactants described hereinafter, a discovery which is entirely unexpected in view of the generalizations summarized by Boudreau above, and a combination which is apparently only operable when employed with the novel liquid polyesters of this invention.

The siloxane-oxyalkylene block copolymer surfactants which have been found to be adaptable for the use in the process of this invention are block copolymers wherein the polysiloxane portion is linked to the polyether portion through the SiOC linkage (hydrolyzable type) or through the Si–C linkage (non-hydrolyzable type).

The synthesis of such polysiloxane-polyoxyalkylene surfactants is described in U.S. Pats. Nos. 3,834,748 and 2,917,480, both patents representing the synthesis of hydrolyzable surfactants and in U.S. Pats. Nos. 2,846,458 and 3,246,048, these patents representing the synthesis of typical non-hydrolyzable surfactants.

The polysiloxane-polyoxyalkylene copolymers suitable for the process of the present invention should contain from 15% by weight to about 30% by weight of the polysiloxane, both the polysiloxane component and the polyether component should have a molecular weight of 700 or somewhat below to about 2000 or somewhat higher; and the polyether portion should contain oxyethylene units or copolymer units comprising oxyethylene units and the balance of the copolymer being predominantly derived from oxypropylene and/or oxybutylene units. Polyether copolymers containing about 40–60% by weight each of ethyleneoxy and 60–40% each of propyleneoxy units are preferred.

One particularly attractive class of copolymer surfactants are those represented by the following formula:

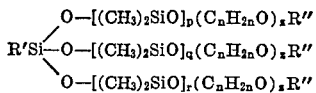

wherein $p+q+r$ are integers having a minimum value of about 4, R' and R" are monovalent hydrocarbyl radicals such as methyl, ethyl, butyl, etc., $n$ is an integer from 2 to 4 denoting the number of carbon atoms in the oxyalkylene group, and $z$ is an integer averaging at least about 18 denoting the length of oxyalkylene chain. A representative composition of the type of compounds or products characterized by the above formula is a composition wherein the values of $p$, $q$ and $r$ are 6 and the $(C_nH_{2n}O)_z$ unit represents a mixed polyoxyethylene-oxypropylene block containing 17 oxyethylene units and 13 oxypropylene units, R' represents ethyl and R" represents the butyl group. Substantial deviations from the above outlined compositions are, of course, within the scope of this invention.

Additional surfactants of this class which may be used include those polysiloxane-polyoxyalkylene copolymer surfactants produced from homopolymers of ethylene oxide as well as copolymers of ethylene oxide and propylene oxide.

The amount of siloxane-oxyalkylene copolymer surfactant normally employed in the emulsifier systems for producing foams of good stability are amounts ranging from 0.1 percent by weight or less to 1.5 percent by weight or more based on the weight of the ingredients of the recipe, i.e. polyester, polyisocyanate, water, catalyst, other additives, etc. It is preferred, however, to employ from about 0.1 to about 0.4 percent by weight of the emulsifier based on the weight of the ingredients of the recipe.

The basic components used in the production of the polyester urethane foams of the present invention are the hydroxyl-terminated polyester resins, the organic polyisocyanate, tertiary amine catalysts, surfactants and water or additional blowing agents. Other additives such as dyes and pigments, flame-proofing agents, cell-size regulators, fillers, and the like may be used however for the production of special foams. Typical additives of this type are discussed in Technical Data Bulletin F–5, entitled, "Flexible Polyester Foam Systems," published by Mobay Chemical Company.

In the formulation of the flexible polyester-urethane foams of the present invention, the so-called "index number," which is the ratio of the actual isocyanate equivalents employed to the equivalents theoretically required to react with the hydroxyl compounds, the carboxyl compounds, and the water, will influence the physical performance of the foam. At an index number of 100, the amount of isocyanate employed corresponds to the amount theoretically required; at an index number above 100, there exists an excess of isocyanate, and at an index number of less than 100, there exists a deficiency of isocyanate. It may generally be stated that the process of the present invention is operable within an index number range of from 80 to about 130, with the index number range from 95 to 115 being highly preferred.

In commercial foaming operations, a predetermined quantity of each ingredient is pumped to a mixing head, where the reactants are properly blended and the foaming mix is deposited for the foaming and subsequent curing operation. The individual ingredients may be metered singly if desired, or certain ingredients, for example the water, catalysts and surfactants, may be pre-mixed before being metered to the mixing head. The initial temperature of the foam ingredients is normally about room temperature, but departures both above and below room temperature are permissible.

The foaming reaction is exothermic, and during the foaming operation of large blocks, temperatures in excess of 150° C. are often encountered. The cure of the foam may be conducted from room temperature to temperatures above 170° C. Cure time will depend on many factors, for example, the amount and type of catalyst, the isocyanate index number, the cure temperature, and the like. Depending upon these factors, most of which are quite well understood in the art, the cure time may be from a few minutes to several days.

The present invention is further exemplified by the following examples but is not to be considered as limited thereto.

In these examples, parts are by weight unless otherwise indicated.

EXAMPLE 1

To a reaction flask equipped with agitator, thermometer, nitrogen ebullator, and Dean-Stark trap fitted with a condenser, there were charged 3150 grams of epsilon-caprolactone, 565.6 grams of adipic acid, 411.6 grams of diethylene glycol, and 187 grams of trimethylolpropane. The reactants were upheated from room temperature to 165° C. over a period of 2 hours, while the system was blanketed with nitrogen. A total of 100 ml. xylene as the azeotroping solvent for water of condensation and 0.43 gram of tetraisopropyl titanate catalyst were now added and heating was continued for 5 hours up to a temperature of 200° C., while water was removed in the form of the xylene-water azeotrope. During this 5-hour period, a further 70 ml. of xylene were added. The aqueous phase collected amounted to 135 ml., and the acid number of the product was measured to be 4.5. The reactants were further heated to 220-240° C. for an additional 4 hours, during which time the acid number was reduced to a very low value. The xylene was now removed by distillation and the reactants were subjected to a vacuum of 2 mm. Hg at 130° C. for about 30 minutes.

The resulting polyester had a hydroxyl number of 56.15, and an acid number of 0.18. The material crystallized within 2 days at room temperature. The above polyester contains approximately 75% by weight of epsilon-oxycaproyl units. Upon remelting of a sample of the crystallized polyester its true melting point was determined to be 32° C. After exposure of the melting point sample to room temperature for less than 24 hours, the material crystallized again. The rapid tendency of this polyester product for crystallization makes the product undesirable for normal flexible polyurethane foaming operations.

EXAMPLE 2

To a reaction flask equipped as described in Example 1, there were charged 2,250 grams of epsilon-caprolactone, 369 grams of adipic acid, 339 grams of dipropylene glycol, and 134 grams of trimethylolpropane. The materials were heated under nitrogen to a temperature of 110° C. and 0.3 gram of tetraisopropyl titanate catalyst and 150 ml. of xylene were added to form the water azeotrope. After a reaction time of 8 hours up to a reaction temperature of 240° C., the acid number was reduced sufficiently to terminate the reaction. During this time, a total of 95 ml. of aqueous distillate had been collected. Xylene was now removed via distillation and the kettle contents were finally subjected to a vacuum of 1 mm. Hg at 135° C. to remove remaining violatiles.

The reslting polyester product had a hydroxyl number of 50.15 and a carboxyl number of 0.36. A total of 19.45 grams of dipropylene glycol was now added and the product was reequilibrated to a lower molecular weight by heating further for 1 hour at 210° C. under an atmosphere of nitrogen. The resulting polyester now had a carboxyl number of 0.48 and a hydroxyl number of 54.65. The material started crystallizing within 2 days at room temperature. Upon exact determination, the melting point of the product was found to be 30.5° C., and the melting point sample crystallized again after 24 to 48 hours.

The above reequilibrated polyester product has an epsilon-oxycaproyl content of about 75 percent by weight. Due to its unexpectedly rapid tendency to crystallize it is not particularly suitable for the manufacture of flexible polyester foams.

Therefore, the preparation of polyesters according to Examples 1 and 2 illustrate the criticality of the upper 72 percent value for the amount of epsilon-oxycaproyl units to be employed in forming the liquid polyesters according to the present invention.

EXAMPLE 3

To a reaction flask equipped with agitator, thermometer, nitrogen ebullator, and Dean-Stark trap fitted with a reflux condenser, there were charged 1272 grams of epsilon-caprolactone, 298 grams of adipic acid, 216.5 grams of diethylene glycol, and 80.5 grams of trimethylolpropane. The reactants were heated from room temperature to 230° C. over a period of 1.5 hours during which time water of condensation was collected. After this time 60 ml. of toluene which served as the azeotroping solvent for the removal of water, and 5 parts per million by weight, based upon the initial reactants charged, of tetraisopropyl titanate polyesterification catalyst, were further charged to the kettle. After a total reaction time of about 5.25 hours, including the initial reaction in the absence of solvent and catalyst, a total of 74 grams of water distillate had been collected. Upon analysis, the carboxyl number of the resulting polyester was found to be 7.3. The reactants were further heated for an additional 4 hours at 235-240° C., while an additional 7 g. of aqueous distillate was collected. The reactants were then cooled to about 150° C., the toluene solvent was removed by distillation, and last traces of volatiles were removed by applying a vacuum of about 2 mm. Hg for 1 hour at a temperature of from 100-130° C. The resulting polyester had a hydroxyl number of 51.8, a carboxyl number of 1.2, and a viscosity of about 29,500 centipoises at 25° C. In contradistinction to the polyesters of Examples 1 and 2 which crystallize readily at room temperature, this polyester which contains about 71 percent of the epsilon-oxycapropyl unit, does not crystallize after 1 month at room temperature. As will be shown hereinafter, the product is admirably suited for the manufacture of flexible polyurethane foams.

EXAMPLE 4

To a reaction flask equipped as described in Example 3, there were charged 1163 grams of epsilon-caprolactone, 368 grams of adipic acid, 267.5 grams of diethylene glycol, and 80.5 grams of trimethylolpropane. The reactants were heated from room temperature to 232° C. for a period of 3 hours under an atmosphere of nitrogen, while water of condensation was collected. After this time the acid number was found to be 11.8. At this stage, a total of 65 ml. of toluene and 5 parts per million (based on the weight of the initial charge of reactants) of tetraisopropyl titanate were added and heating was continued for an additional 5.5 hours at a temperature of from 230-240° C. The total amount of aqueous phase collected was 100 grams of distillate. The toluene was removed by distillation and the reactants were further subjected to a vacuum of 2 mm. Hg at 130° C. Upon analysis, the resulting polyester has a hydroxyl number of 50.8, a carboxyl number of 0.94, and a viscosity of 37,500 centipoises at 25° C. The product did not crystallize at room temperature within a period of at least one month. It is also admirably suited for the production of flexible polyester foams. The polyester has an epsilon, oxycaproyl content of about 65 percent by weight.

EXAMPLE 5

To a reaction flask equipped as described in Example 3, there were charged 536 grams of epsilon-caprolactone, 643 grams of adipic acid, 467 grams of diethylene glycol, and 67.1 grams of trimethylolpropane. The reactants were heated from room temperature to 230° C. for a period of 2 hours under an atmosphere of nitrogen, while water of condensation was collected. At this time a total of 50 ml. of toluene and 5 parts per million (by weight based on the initial charge) of tetraisopropyl titanate were added and the reaction was continued at a temperature of 230–240° C. for a period of 5.5 hours. After this time a total of 164 grams of aqueous phase had been collected and the acid number of the product was 8.2. The reaction was now continued for a further 5 hours at about 236° C. After this time an additional 8 grams of aqueous condensate had been collected. The toluene was now removed by distillation and the reactants were further subjected to a vacuum of 1–3 mm. Hg at 130° C. Upon analysis, the resulting polyester was shown to have a hydroxyl number of 46.7, a carboxyl number of 0.60, and a viscosity of 8,800 centipoises at 25° C. The product remained liquid at room temperature for many weeks without showing any tendency of crystallization. The polyester contains about 35 percent by weight of the epsilon-oxycaproyl unit. The product is admirably suited for the manufacture of flexible polyester foams.

EXAMPLE 6

This example illustrates the preparation of a copolyesterdiol comprised of, by weight, 65 percent by weight of 6-oxycaproyl residues derived from 6-hydroxycaproic acid and oligomer residues thereof, the balance being derived from adipic acid, diethylene glycol, and trimethylolpropane, all coreactants being employed in the amounts theoretically required for preparation of the slightly branched polyester having a hydroxyl equivalent weight of about 1000.

To a 12-liter Pyrex reaction flask equipped with agitator, thermometer, nitrogen inlet, heating mantle and Dean-Stark trap equipped with reflux condenser, there were charged, 1,025 grams of water and 6,500 grams of epsilon-caprolactone and the solution was heated at 98–107° C. for 4 hours. During this time, the apparent percentage conversion to 6-hydroxycaproic acid passed through a peak of at least 55 percent, the difference being oligomers thereof. About 300 ml. of water were then distilled from the oligomer mixture at atmospheric pressure. Adipic acid (2056 grams) diethylene glycol (1495 grams), and trimethylolpropane (450 grams) then were charged to the flask, and the temperature of the reaction mixture was increased to 230° C. while distilling off water through a 300 mm. fractionating column packed with glass helices. The pressure was reduced as necessary to maintain steady distillation of water. A total of 20 hours reaction time were required at about 235° C. and as low as 20 mm. Hg to reduce the carboxyl number below 2. The hydroxyl number was then found to be 56.6, the carboxyl number 1.5, and the viscosity about 30,000 centipoises at 25° C. After storage at 20–25° C. for 30 days, no evidence of crystallization had occured. The product is eminently suitable for the preparation of flexible polyester foams.

EXAMPLE 7

To a reaction flask equipped as described in Example 3, there was charged 1267.5 grams of epsilon-caprolactone, 408.5 grams of adipic acid, 331.1 grams of diethylene glycol and 43.6 grams of trimethylolpropane. The reactants were up-heated to 230° C. for a period of 7 hours under an atmosphere of nitrogen while water of condensation was collected. After this time the acid number was found to be 5.9 at this stage, a total of 75 ml. of toluene and 5 parts per million (based on the weight of the initial charge of reactants) of tetraisopropyl titanate were added and heating was continued for an additional four hours at a temperature of from 230–238° C. The total amount of aqueous phase collected was 107 grams of distillate. The toluene was removed by distillation and the reactants were further subjected to a vacuum of 2 mm. Hg at 130° C. for 1.5 hours. Upon analysis, the resulting polyester was found to have a hydroxyl number of 47.4, a carboxyl number of 1.04, and a viscosity of 15,000 centipoises at 25° C. The product did not crystallize at room temperature within a period of at least one month. It is also admirably suited for the production of flexible polyester foams. The polyester has an epsilon-oxycaproyl content of about 65 percent by weight.

EXAMPLE 8

To a reaction flask equipped as described in Example 3, there were charged 492.2 grams of epsilon-caprolactone, 1022.9 grams of adipic acid, 742.8 grams of diethylene glycol, and 93.9 grams of trimethylolpropane. The reactants were heated from room temperature to 205° C. for a period of 2 hours under an atmosphere of nitrogen while water of condensation was collected. At this time a total of 72 ml. of toluene was added and the reaction continued an additional 2.5 hours at 235° C.; 247 grams of water was colected and 9 parts per million (by weight based on the initial charge) of tetraisopropyl titanate was added. At this time the carboxyl number was found to be 3.16. The reaction was continued at a temperature of 235° C. for a period of 3.2 hours. After this time a total of 272.5 grams of aqueous phase had been collected and the carboxyl number of the product was 0.45.

The toluene was now removed by distillation and the reactants were further subjected to a vacuum of 1–3 mm. Hg at 120–130° C. Upon analysis, the resulting polyester was found to have a hydroxyl number of 56.7, a carboxyl number of 0.18, and a viscosity of 31,000 centipoises at 25° C. The product remained liquid at room temperature for many weeks without showing any tendency of crystallization. The polyester contains about 23.4 percent by weight of the epsilon-oxycaproyl unit.

EXAMPLE 9

To a reaction flask equipped with agitator, thermomester, nitrogen ebullator, and Dean-Stark trap fitted with a reflux condenser, there were charged 267.9 grams of epsilon-caprolactone, 1271.4 grams of adipic acid, 923.2 grams of diethylene glycol, and 100.6 grams of trimethylolpropane. The reactants were heated from room temperature to 220° C. over a period of 4.5 hours during which time water of condensation was collected. After this time 78 ml. of toluene which served as the azeotroping solvent for the removal of water, and 6 parts per million by weight, based upon the initial reactants charged, of tetraisopropyl titanate polyesterification catalyst, were further charged to the reaction flask. After a total reaction time of about 8.5 hours, including the initial reaction in the absence of solvent and catalyst, a total of 315 grams of water distillate had been collected. Upon analysis, the carboxyl number of the resulting polyester was found to be 7.66. The reactants were further heated for an additional 2 hours at 25–230° C. while an additional 5 g. of aqueous distillate was collected. The reactants were then cooled to about 150° C., the toluene solvent was removed by distillation, and last traces of volatiles were removed by applying a vacuum of about 2 mm. Hg for 1 hour at a temperature of from 100–130° C. The resulting polyester had a hydroxyl number of 56.2, a carboxyl number of 1.0, and a viscosity of about 32,300 centipoises at 26° C. The polyester contains about 11.9 percent of the epsilon-oxycaproyl unit, and does not crystalize after 1 month at room temperature.

EXAMPLE 10

To a reaction flask equipped as described in Example 3, there were charged 1300 grams of epsilon-caprolactone, 408.8 grams of adipic acid, 339.2 grams of diethylene glycol, and 100.8 grams of trimethylolpropane. The reactants were heated from room temperature to 230° C. for a period of 2.5 hours under an atmosphere if nitrogen, while water of condensation was collected. At this stage, a total of 65 ml. of toluene and 5 parts per million (based on the weight of the initial charge of reactants) of tetraisopropyl titanate were added and heating was continued for an additional 5.0 hours at a temperature of from 230–237° C. The total amount of aqueous phase collected was 225 ml. of distillate. After this time the acid number was found to be 1.32. The toluene was removed by distillation and the reactants were further subjected to a vacuum of 2 mm. Hg at 130° C. Upon analysis, the resulting polyester has a hydroxyl number of 55.78, a carboxyl number of 1.2, and a viscosity of 10,600 centipoises at 26° C. The product does not crystallize at room temperature within a period of at least one month. It is also admirably suited for the production of flexible polyester foams. The polyester has an epsilon-oxycaproyl content of about 65 percent by weight.

EXAMPLE 11

The polyester products synthesized in the preceding examples were further analyzed by means of their respective melting points. For this purpose, a 1–2 gm. sample thereof was super-cooled at −23° C. in a test tube until complete crystallization had occured. The test tube was then immersed in a water-bath and the sample was upheated slowly. The true melting point of the polyester was the temperature obseerved at which the entire sample had again become liquid. Table I demonstrates the results of this test and describes further the epsilon-oxycaproyl unit content of each material tested:

TABLE I.—MELTING POINTS OF POLYESTERS

| Polyester | Melting point, ° C. | ε-Oxy-caproyl, weight percent |
| --- | --- | --- |
| Ex. 1 | 32.0 | 75 |
| Ex. 2 | 30.5 | 75 |
| Ex. 3 | 27.0 | 71 |
| Ex. 4 | 23.0 | 65 |
| Ex. 7 | 20.0 | 65 |
| Ex. 10 | 17.0 | 65 |
| Ex. 5 | 8.0 | 35 |
| Ex. 8 | 5.0 | 23 |
| Ex. 9 | 15.0 | 12 |

The above table illustrates clearly that the polyester products having an epsilon-oxycaproyl content of from about 10 to about 72–73% by weight possess melting points of generally less than 30° C. Moreover, the products would not be expected to crystallize at all under normal room temperature conditions at an epsilon-oxycaproyl content of 65% by weight or less. These properties make them ideally suited for use in the manufacture of flexible polyester foams.

EXAMPLE 12

In order to obtain a relative comparison of the resistance of the polyester products of the present invention against hydrolysis, a series of experiments were conducted wherein polyester products of the prior art were compared with the polyester products of the present invention. Such hydrolysis tests are not only useful for comparison of various polyesters with each other, but they also are indicators for expected performance of the corresponding flexible polyester foams in their resistance toward humid environments.

In the present study, a series of polyester products containing from 0% to about 95% by weight of the ε-oxypaproyl unit were subjected to hydrolysis tests. Hydrolysis of all polyester products in the presence of a large excess of water but in the absence of base or acid was very slow for all products tested. For obtaining a reading regarding their expected performance in a polyurethane foam, hydrolysis tests in the presence of base are more realistic, since polyester foams normally retain substantial quantities of tertiary amine bases (catalyst residues) for prolonged periods. In order to obtain accelerated hydrolysis and/or saponification rates, the polyesters were therefore subjected to strong base at a temperature of 60° C. The tests were accomplished in the following manner:

A 10 gm. sample of the polyester tested was added to a 500 ml. reaction flask equipped with agitator, thermometer, and reflux condenser. The test was conducted under nitrogen atmosphere. To the flask there were added 200 ml. of distilled water, 50 ml. of 0.5 N NaOH and 2 ml. of a 1% solution of phenolphthalein in distilled water. The resulting aqueous phase showed the typical pink color of the indicator. The reactants were then heated to 60° C. and the polyester dispersions were agitated at constant speed until the pink color of the indicator disappeared, indicating that the base had been neutralized by the hydrolyzed fragments of the polyester. The number of hours required for disappearance of the base were noted. Table II demonstrates the results observed:

TABLE II.—HYDROLYSIS, SAPONIFICATION OF POLYESTERS

| Polyester | Hours, color disappearance | ε-Oxy-caproyl, weight percent |
| --- | --- | --- |
| "Fomrez"-50 | 14.5 | 0 |
| Ex. 9 | 58.5 | 12 |
| Ex. 6 | 162.5 | 23 |
| Ex. 5 | 272 | 35 |
| Ex. 4 | 390 | 65 |
| Polyol D-560 | >550 | 95 |

In the above table, polyester "Fomrez"-50 (Witco Chemical Company) represents a standard polyester product utilized in the manufacture of flexible polyester foams. This polyester comprises a reaction product of adipic acid, diethylene glycol and a small amount of trimethylolpropane, said polyester having a hydroxyl number of about 54. Polyol D-560 (Union Carbide Corporation) represents a polycaprolactone diol shown by saponification to contain about 95% by weight of the ε-oxycaproyl unit. However, due to its high melting point (55–60° C.), it is not suitable for the manufacture of flexible foams. The other polyester products tested contain from 12% to 65% by weight of the ε-oxycaproyl unit.

The results indicate that polyester products containing as little as 12–23% by weight of the ε-oxycaproyl unit exhibit a dramatic improvement with regard to hydrolysis-saponification stability. Products containing the higher range of ε-oxycaproyl exhibit progressively increased stability.

Based upon the above results and further based upon the results described in Example 11, it may be stated that the polyester products of the present invention should contain from about 10% to about 72% by weight of the ε-oxycaproyl unit to result in flexible polyester foams of improved hydrolytic stability. Within this range, the range of from 30% to about 72% by weight of the ε-oxycaproyl unit is still more highly preferred.

The polyesters described as above were reacted with mixtures of 2,4- and 2,6-toluene diisocyanates, water, tertiary amine catalysts and various surfactants, several of which are recommended surfactants for the manufacture of flexible polyester urethane foams now commercially utilized with the polyesters of the prior art. Typical polyesters of the prior art were also foamed in the manner indicated. Observations regarding the cell structure of the resulting foams were recorded and conclusions were drawn therefrom whether or not a particular surfactant system could be utilized for successful commercial foam manufacture.

Very unexpectedly it was observed that the recommended surfactants for polyester foams of the prior art did not result in commercially acceptable foam products from the novel polyesters of the examples which contain from 72 percent by weight to 35 percent by weight of the epsilon-oxycaproyl unit. Thus, it is clearly demonstrated herein that polyester products containing a substantial proportion of the epsilon-oxycaproyl unit require the use of newly defined surfactant systems. Very surprisingly, it was observed that the polysiloxane-polyoxyalkylene surfactant types which were heretofore recommended for "one-shot" polyether urethane foams are admirably suited for the foaming of the polyester types containing the epsilon-oxycaproyl unit. Moreover, it was observed that within the polysiloxane-polyoxyalkylene surfactant group, not only the types based on polyoxyalkylene units comprising copolymers of ethylene and propylene oxide, but also the types based on polyoxyalkylene units comprising homopolymers of ethylene oxide are eminently suitable in the process of the present invention. In this respect, the flexible polyester foam systems of the present invention differ evidently considerably from the flexible polyether foam systems of the prior art (see for example, R. J. Boudreau, Modern Plastics, vol. 44, No. 5, page 144, 1967). Within the group of polysiloxane-polyoxyalkylene surfactants it was further noted that hydrolyzable types, wherein the polysiloxane units are connected to the polyoxyalkylene units by means of an Si—O—C linkage, as well as the non-hydrolyzable types, wherein the polysiloxane units are connected to the polyoxyalkylene units by means of the Si—C linkage, are both operable. Conversely, it was also observed that the polyester products of the present invention containing from about 10% to about 25% by weight of the epsilon-oxycaproyl unit could be foamed successfully by means of the prior art polyester surfactants, but not by means of the above-described polysiloxane-polyoxyalkylene surfactants. The methods by which these foaming operations were conducted are described hereinafter, only the recipe being listed in each example.

In the following examples, certain commercial trade names for prior art products are referred to and the meaning of such terms may be obtained from the following table of terms, each of the terms being identified by number.

TABLE III

[1] Multron R-74 is a slightly branched adipic acid-diethylene glycol polyester, OH No.=53±3; sold by Nobay Chemical Company.

[2] Witco 77-86 is a surfacant recommended for flexible polyester foams; sold by Witco Chemical Company.

[3] Additive A-3 is a surfactant recommended for flexible polyester foams; sold by Mobay Chemical Company.

[4] Fomrez-50 is a slightly branched adipic acid-diethylene glycol polyester, OH No=50-55; sold by Witco Chemical Company.

[5] L-532 is a silicone surfactant recommended for flexible polyester foams; sold by Union Carbide Corporation.

[6] Armeen DM-16 D is an N,N-dimethyl fatty amine catalyst comprising largely N,N-Dimethylhexadecylamine; sold by Armour Chemical Company.

[7] Y-6116 is a non-hydrolyzable polysiloxane-polyoxyalkylene surfactant, sold by Union Carbide Corporation.

[8] L-531 is a non-hydrolyzable polysiloxane-polyoxyalkylene surfactant; sold by Union Carbide Corporation.

[9] L-5310 is a non-hydrolyzable polysiloxane-polyoxyalkylene surfactant; sold by Union Carbide Corporation.

[10] L-520 is a hydrolyzable polysiloxane-polyoxyalkylene surfactant; sold by Union Carbide Corporation.

[11] L-5410 is a non-hydrolyzable polysiloxane-polyoxyalkylene surfactant; sold by Union Carbide Corporation.

12 L-530 is a non-hydrolyzable polysiloxane-polyoxyalkylene surfactant; sold by Union Carbide Corporation.

EXAMPLE 13

Recipe:
| Ingredient: | Amount (grams) |
|---|---|
| Polyester: Multron R-74[1] | 100 |
| TDI-Isomer: 80:20 | 44.7 |
| $H_2O$ | 3.6 |
| Surfactant: | |
| Witco 77-86[2] | 1.9 |
| Additive A-3[3] | 1.5 |
| Catalyst: | |
| N-ethylmorpholine | 2.0 |
| N-Cocomorpholine | 2.0 |

EXAMPLE 14

Recipe:
| Ingredient: | Amount (gram) |
|---|---|
| Polyester: Fomrez-50[4] | 100 |
| TDI-Isomer: 80:20 | 44.8 |
| $H_2O$ | 3.6 |
| Surfactant: L-532[5] | 1.0 |
| Catalyst: | |
| N-Ethylmorpholine | 1.9 |
| Armeen DM-16D[6] | 0.3 |

EXAMPLE 15

Recipe:
| Ingredient: | Amount (grams) |
|---|---|
| Polyester: Fomrez-50 | 100 |
| TDI-Isomer: 80:20 | 44.8 |
| $H_2O$ | 3.6 |
| Surfactant: Y-6116[7] | 0.4 |
| Catalyst: | |
| N-Ethylmorpholine | 1.7 |
| Armeen DM-16D | 0.3 |

EXAMPLE 16

Recipe:
| Ingredient: | Amount (grams) |
|---|---|
| Polyester: Fomrez-50 | 100 |
| TDI-Isomer: 80:20 | 44.8 |
| $H_2O$ | 3.6 |
| Surfactant: L-531[8] | 1.0 |
| Catalyst: | |
| N-Ethylmorpholine | 1.9 |
| Armeen DM-16D | 0.3 |

EXAMPLE 17

Recipe:
| Ingredient: | Amount (grams) |
|---|---|
| Polyester: Fomrez-50 | 100 |
| TDI-Isomer: 80:20 | 44.8 |
| $H_2O$ | 3.6 |
| Surfactant: L-531 | 0.5 |
| Catalyst: | |
| N-Ethylmorpholine | 1.8 |
| Armeen DM-16D | 0.3 |

EXAMPLE 18

Recipe:
| Ingredient: | Amount (grams) |
|---|---|
| Polyester: Polyester of Example 4 | 100 |
| TDI-Isomer: 80:20 | 42.4 |
| $H_2O$ | 3.5 |
| Surfactant: | |
| Witco 77-86 | 1.9 |
| Additive A-3 | 1.5 |
| Catalyst: | |
| N-Ethylmorpholine | 2.0 |
| N-Cocomorpholine | 2.0 |

EXAMPLE 19

Recipe:

Ingredient: Amount (grams)
- Polyester: Polyester of Example 4 — 100
- TDI-Isomer: 80:20 — 42.4
- H₂O — 3.5
- Surfactant:
  - Witco 77-86 — 1.5
  - Additive A-3 — 0.5
- Catalyst:
  - N-Ethylmorpholine — 1.5
  - N-Cocomorpholine — 0.5
  - Armeen DM-16D — 0.3

EXAMPLE 20

Recipe:

Ingredient: Amount (grams)
- Polyester: Polyester of Example 4 — 100
- TDI-Isomer: 80:20 — 42.4
- H₂O — 3.5
- Surfactant:
  - Witco 77-86 — 1.5
  - Additive A-3 — 1.0
- Catalyst: N-Ethylmorpholine — 2.0

EXAMPLE 21

Recipe:

Ingredient: Amount (grams)
- Polyester: Polyester of Example 4 — 100
- TDI-Isomer: 73:27 — 44.8
- H₂O — 3.6
- Surfactant: L-532 — 1.0
- Catalyst: N,N-Dimethylbenzylamine — 1.2

EXAMPLE 22

Recipe:

Ingredient: Amount (grams)
- Polyester: Polyester of Example 3 — 100
- TDI-Isomer: 65:35 — 44.9
- H₂O — 3.6
- Surfactant: L-532 — 0.4
- Catalyst: N,N-Dimethylbenzylamine — 1.2

EXAMPLE 23

Recipe:

Ingredient: Amount (grams)
- Polyester: Polyester of Example 3 — 100
- TDI-Isomer: 65:35 — 44.9
- H₂O — 3.6
- Surfactant: Y-6116 — 0.4
- Catalyst: N,N-Dimethylbenzylamine — 1.2

EXAMPLE 24

Recipe:

Ingredient: Amount (grams)
- Polyester: Polyester of Example 3 — 100
- TDI-Isomer: 65:35 — 44.9
- H₂O — 3.6
- Surfactant: L-5310 [9] — 0.4
- Catalyst: N,N-Dimethylbenzylamine — 1.2

EXAMPLE 25

Recipe:

Ingredient: Amount (grams)
- Polyester: Polyester of Example 3 — 100
- TDI-Isomer: 65:35 — 44.9
- H₂O — 3.6
- Surfactant: L-531 — 0.4
- Catalyst: N,N-Dimethylbenzylamine — 1.2

EXAMPLE 26

Recipe:

Ingredient: Amount (grams)
- Polyester: Polyester of Example 3 — 100
- TDI-Isomer: 65:35 — 44.9
- H₂O — 3.6
- Surfactant: L-520 [10] — 0.4
- Catalyst: N,N-Dimethylbenzylamine — 1.2

EXAMPLE 27

Recipe:

Ingredient: Amount (grams)
- Polyester: Polyester of Example 3 — 100
- TDI-Isomer: 65:35 — 44.9
- H₂O — 3.6
- Surfactant: L-5410 [11] — 0.4
- Catalyst: N,N-Dimethylbenzylamine — 1.2

EXAMPLE 28

Recipe:

Ingredient: Amount (grams)
- Polyester: Polyester of Example 3 — 100
- TDI-Isomer: 80:20 — 44.9
- H₂O — 3.6
- Surfactant: L-531 — 0.35
- Catalyst:
  - N-Ethylmorpholine — 1.7
  - N-Cocomorpholine — 0.4

EXAMPLE 29

Recipe:

Ingredient: Amount (grams)
- Polyester: Polyester of Example 4 — 100
- TDI-Isomer: 65:35 — 44.8
- H₂O — 3.6
- Surfactant: Y-61 [16] — 0.4
- Catalyst: N,N.-Dimethylbenzylamine — 1.2

EXAMPLE 30

Recipe:

Ingredient: Amount (grams)
- Polyester: Polyester of Example 5 — 100
- TDI-Isomer: 65:35 — 42.8
- H₂O — 3.6
- Surfactant: Y-61 [16] — 0.5
- Catalyst: N,N-Dimethylbenzylamine — 1.2

EXAMPLE 31

Recipe:

Ingredient: Amount (grams)
- Polyester: Polyester of Example 5 — 100
- TDI-Isomer: 65:35 — 42.8
- H₂O — 3.6
- Surfactant: L-532 — 0.5
- Catalyst: N,N-Dimethylbenzylamine — 1.2

EXAMPLE 32

Recipe:

Ingredient: Amount (grams)
- Polyester: Polyester of Example 6 — 100
- TDI-Isomer: 80:20 — 45.0
- H₂O — 3.6
- Surfactant: L-530 [12] — 0.5
- Catalyst: N,N-Dimethylbenzylamine — 1.2

EXAMPLE 33

Recipe:

Ingredient: Amount (grams)
- Polyester: Polyester of Example 7 — 100
- TDI-Isomer: 80:20 — 44.3
- H₂O — 3.6
- Surfactant: L-532 — 1.0
- Catalyst:
  - N-Ethylmorpholine — 1.9
  - Armeen DM-16D — 0.3

EXAMPLE 34

Recipe:

| Ingredient: | Amount (grams) |
|---|---|
| Polyester: Polyester of Example 7 | 100 |
| TDI-Isomer: 80:20 | 44.3 |
| $H_2O$ | 3.6 |
| Surfactant: L-531 | 0.4 |
| Catalyst: | |
|     N-Ethylmorpholine | 1.9 |
|     Armeen DM-16D | 0.3 |

EXAMPLE 35

Recipe:

| Ingredient: | Amount (grams) |
|---|---|
| Polyester: Polyester of Example 7 | 100 |
| TDI-Isomer: 80:20 | 44.3 |
| $H_2O$ | 3.6 |
| Surfactant: L-531 | 0.2 |
| Catalyst: | |
|     N-Ethylmorpholine | 1.9 |
|     Armeen DM-16D | 0.3 |

EXAMPLE 36

Recipe:

| Ingredient: | Amount (grams) |
|---|---|
| Polyester: Polyester of Example 7 | 100 |
| TDI-Isomer: 80:20 | 44.3 |
| $H_2O$ | 3.6 |
| Surfactant: L-532 | 1.0 |
| Catalyst: N,N-Dimethylbenzylamine | 1.2 |

EXAMPLE 37

Recipe:

| Ingredient: | Amount (grams) |
|---|---|
| Polyester: Polyester of Example 7 | 100 |
| TDI-Isomer: 80:20 | 44.3 |
| $H_2O$ | 3.6 |
| Surfactant: L-531 | 0.2 |
| Catalyst: N,N-Dimethylbenzylamine | 1.2 |

EXAMPLE 38

Recipe:

| Ingredient: | Amount (grams) |
|---|---|
| Polyester: Polyester of Example 7 | 100 |
| TDI-Isomer: 80:20 | 44.3 |
| $H_2O$ | 3.6 |
| Surfactant: L-531 | 0.1 |
| Catalyst: N,N-Dimethylbenzylamine | 1.2 |

EXAMPLE 39

Recipe:

| Ingredient: | Amount (grams) |
|---|---|
| Polyester: Polyester of Example 8 | 100 |
| TDI-Isomer: 80:20 | 45.8 |
| $H_2O$ | 3.6 |
| Surfactant: L-532 | 1.0 |
| Catalyst: | |
|     N-Ethylmorpholine | 1.9 |
|     Armeen DM-16D | 0.3 |

EXAMPLE 40

Recipe:

| Ingredient: | Amount (grams) |
|---|---|
| Polyester: Polyester of Example 9 | 100 |
| TDI-Isomer: 80:20 | 45.7 |
| $H_2O$ | 3.6 |
| Surfactant: L-532 | 1.0 |
| Catalyst: | |
|     N-Ethylmorpholine | 1.9 |
|     Armeen DM-16D | 0.3 |

EXAMPLE 41

Recipe:

| Ingredient: | Amount (grams) |
|---|---|
| Polyester: Polyester of Example 5 | 100 |
| TDI-Isomer: 80:20 | 42 |
| $H_2O$ | 3.6 |
| Surfactant: L-532 | 1.0 |
| Catalyst: | |
|     N-Ethylmorpholine | 1.9 |
|     Armeen DM-16D | 0.3 |

EXAMPLE 42

Recipe:

| Ingredient: | Amount (grams) |
|---|---|
| Polyester: Polyester of Example 10 | 100 |
| TDI-Isomer: 80:20 | 45.6 |
| $H_2O$ | 3.6 |
| Fluorocarbon 11 | 6.0 |
| Surfactant: L-531 | 0.2 |
| Catalyst: | |
|     N-Ethylmorpholine | 1.9 |
|     Armeen DM-16D | 0.3 |

In preparing the foams in Examples 13 to 42, the polyester, water, surfactant and catalysts were premixed by means of an electric stirrer. The required amount of the isocyanate was then added and the ingredients were mixed rapidly until foaming of the mix commenced. The foaming mixture was then quickly transferred into a cylindrical one gallon cardboard container with open top where the foam was allowed to expand to full height. The foams were cured for 4 hours in an air-circulating oven at 105° C., cut and examined for cell structure. In the case of the more promising products, their free-blow density was also determined.

As control foam experiments, commercial polyesters (Multron R-74, Fomrez-50), comprising slightly branched reaction products of adipic acid, diethylene glycol and trimethylolpropane, were foamed with the surfactants and catalysts recommended by the prior art (Examples 13 and 14). The resulting foams had excellent cell structure as the art had taught. A commercial polyester (Fomrez-50) was then foamed with typical polysiloxane-polyoxyalkylene surfactants (L-531, Y-6116) recommended for polyether foams (Examples 15, 16, and 17). The resulting foams had very poor cell structure and do not represent commercially suitable products. Next, the polyester products of the present invention (Polyesters described in Examples 3, 4 and 5 of the present invention) were foamed with the surfactants recommended for commercial polyester foam operation (Surfactants Witco 77-86, Additive A-3, Silicone L-532) and the resulting products were examined (Examples No. 18, 19, 20, 21, 22 and 31). The resulting foams had again very poor cell structure and do not represent commercially suitable products.

Very surprisingly, when the polyester products of the present invention (Polyesters described in Examples 3, 4, 5 and 6) were foamed with a rather wide variety of polysiloxane-polyoxyalkylene surfactants normally recommended for rigid and flexible polyether foams of the prior art (Surfactants Y-6116, L-5310, L-531, L-520, L-5410 and L-530) all the resulting foams upon examination showed the presence of uniform, commercially acceptable cell structure (Examples 23, 24, 25, 26, 27, 28, 29, 30 and 32).

Although there existed some variation with regard to cell size between the above listed polysiloxane-polyoxyalkylene surfactants, they all resulted in products which have commercial utility. It was further noted with respect to the surfactant concentration that just as in the case of the commercial adipic acid polyester foams (see for example, Bulletin No. F-1, Witco Chemical Company; and Technical Data Bulletin No. F-5, Mobay Chemical Company), excess amounts of polysiloxane-polyoxyalkylene surfactants can lead to coarse cell formation, and even cell collapse. In this respect, the polyester foam systems differ substantially from the polyether systems of the prior art. Consequently, sufficient experimentation is required by persons skilled in the art, with each of the polysiloxane-polyoxyalkylene surfactants when foaming the polyesters of the present invention, which contain from 35-72% of the epsilon-oxycaproyl unit, to establish the proper surfactant working limits.

It was further found that the polyesters containing 12% and 23% by weight of the epsilon-oxycaproyl unit (Polyesters, Examples 9 and 8) could be foamed successfully by means of one of the recommended prior art surfactants, namely L-532 (Examples 39 and 40), whereas inferior foams would result in attempts to foam them with the above polysiloxane-polyoxyalkylene surfactants.

The cell structure, density and appropriate remarks concerning the foams obtained from above Examples 13 to 42 are set forth hereinbelow in Table IV which supports the above remarks:

| Test | Foam A | Foam B |
|---|---|---|
| Density, lbs./cu. ft. | 1.8 | 2.15 |
| Tensile strength, p.s.i. | 29 | 32.0 |
| Elongation, percent | 300 | 32.0 |
| Compression set, 158° F., 22 hours at 50% deflection, percent | 6.5 | 7.5 |
| Compression-deflection, p.s.i.: | | |
| 25% | 0.60 | 0.65 |
| 50% | 0.81 | 0.87 |
| 75% | 2.03 | 2.21 |

A preliminary comparison of the humid aging performance at 250° F., 15 p.s.i. pressure showed that Foam B is substantially superior to Foam A in the retention of the compressive load during the humid aging exposure.

The above tests were conducted according to the methods described by American Standards for Methods of Testing, Part 28, specifically D 1564-64T.

The tests indicate that the physical characteristics of Foam B, representing the foamed polymers of the present invention, are very comparable to standard commercial foams.

TABLE IV

| Example | Cell structure | Density, lbs./cu. ft. | Remarks |
|---|---|---|---|
| 13 | Uniform, regular cell structure | 1.8 | Commercially acceptable product. |
| 14 | Uniform, fine cell structure | 1.8 | Do. |
| 15 | Very large cells | 1.9 | Commercially unacceptable product. |
| 16 | Foam collapsed at top of rise | | Do. |
| 17 | do | | Do. |
| 18 | Irregular cell structure, many very large cells | | Do. |
| 19 | Foam collapsed at top of rise | | Do. |
| 20 | Very poor cell structure, many very large cells | | Do. |
| 21 | Irregular cell structure, many very large cells | | Do. |
| 22 | do | | Do. |
| 23 | Uniform, regular cell structure | 2.5 | Commercially acceptable product. |
| 24 | Uniform, fine cell structure | 2.8 | Do. |
| 25 | do | 3.0 | Do. |
| 26 | do | 2.6 | Do. |
| 27 | do | 2.9 | Do. |
| 28 | do | 2.25 | Do. |
| 29 | Uniform, regular cell structure | 2.6 | Do. |
| 30 | do | 2.5 | Do. |
| 31 | Very poor cell structure, many very large cells | | Commercially unacceptable product. |
| 32 | Uniform, fine cell structure | 2.6 | Commercially acceptable product. |
| 33 | Irregular cell structures, many very large cells | 2.25 | Commercially unacceptable product. |
| 34 | Uniform, fine cell structure, one split | | Do. |
| 35 | Uniform, fine cell structure | 2.2 | Commercially acceptable product. |
| 36 | Irregular cell structure, many very large cells | 2.35 | Commercially unacceptable product. |
| 37 | Uniform fine cell structure, one split | 2.7 | Do. |
| 38 | Uniform, fine cell structure | 2.4 | Commercially acceptable product. |
| 39 | Uniform regular cell structure | | Do. |
| 40 | do | 2.2 | Do. |
| 41 | Irregular cell structure (small and large cells) | | Commercially unacceptable product. |
| 42 | Fine, uniform cell structure | 1.89 | Do. |

EXAMPLE 43

For the purpose of comparing the physical characteristics of the novel foams, a commercial polyester product of the prior art, namely Multron R-74, was foamed and compared with a foamed product prepared from the polyester of Example 7. The following ingredients were conversed to flexible polyester foams according to the hand foaming techniques described with respect to Examples 13 to 47.

| Foam A | | Foam B | |
|---|---|---|---|
| Ingredient | Amount, grams | Ingredient | Amount, grams |
| Multron R-74 | 200 | Polyester example | 200 |
| N-ethylmorpholine | 3.6 | N-ethylmorpholine | 3.4 |
| N-cocomorpholine | 1.0 | N-cocomorpholine | 0.8 |
| Armeen DM-16D | 0.6 | | |
| Witco 77-86 | 3.0 | Surfactant L-531 | 0.70 |
| Additive A-3 | 1.0 | | |
| Water | 7.2 | Water | 7.2 |
| 80:20 TDI | 90.0 | 80:20 TDI | 90.0 |

The above foams were cured in an oven at a temperature of 105° C. for a period of 4 hours. After further cure at room temperature for a period of 2 weeks, they exhibited the following physical properties.

EXAMPLE 44

One hundred grams of the polyester of Example 6 was converted to a polyurethane foam by reacting with 3.6 grams of water and 45 grams of the 80:20 mixture of 2,4- and 2,6-toluene diisocyanates in the presence of 1.2 grams of N,N-dimethylbenzylamine catalyst and 0.4 gram of L-531 polysiloxane-polyoxyalkylene surfactant. Upon cure, the resulting flexible polyester foam was found to have small uniform cell structure and the product had a density of 1.9 lbs./cu. ft.

This example demonstrates the manufacture of a polyurethane foam from a polyester containing about 65 percent of the epsilon-oxycaproyl unit, said polyester being prepared from a mixture of 6-hydroxycaproic acid and its lower oligomers.

EXAMPLE 45

A high density flexible polyester foam was prepared by foaming a recipe comprising 95 grams of the polyester of Example 3, 5 grams of 1,4-butanediol, 0.2 gram of water, 0.4 gram of Dabco 33 LV catalyst (33% triethylenediamine solution in dipropylene glycol), 0.1 gram of surfactant L-530, and 33.4 grams of Isonate 143L (The (Upjohn Company, diphenylmethane diisocyanates and carbodiimide derivatives thereof) according to the conventional hand batch procedure. The resulting foam ex-

What is claimed is:

1. Flexible polyurethane foams having good hydrolytic stability prepared by reacting:
   (a) liquid polyesters remaining liquid over an extended period of time having a hydroxyl equivalent weight of from about 800 to about 1400 containing from about 10 to 72 percent by weight of the epsilon-oxycaproyl unit

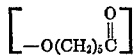

prepared by the reaction of about 10 to 72 percent epsilon-carprolactone with about 90 to 28 percent of a component comprising reacted segments of an organic dicarboxylic acid or its corresponding anhydride, an alkylene glycol and from about 0.1 to 5 percent based on the total charge of reactants in the polyester reaction, of a polyol branching agent;
   (b) an organic polyisocyanate;
   (c) a blowing agent;
   (d) a catalyst; and
   (e) a surfactant.

2. Flexible polyurethane foams according to claim 1 wherein the dicarboxylic acid or anhydride is selected from the group consisting of adipic acid, succinic acid, glutaric, acid, pimelic acid, azelaic acid and sebacic acid, their anhydrides, and mixtures thereof.

3. Flexible polyurethane foams according to claim 2 wherein the alkylene glycol is selected from the group consisting of ethylene glycol, propylene glycol, diethylene glycol, dipropylene glycol, 1,3-butylene glycol and neopentylene glycol.

4. Flexible polyurethane foams according to claim 3 wherein the polyol branching agent is selected from the group consisting of glycerine, 1,2,6-hexanetriol, trimethylolpropane, pentaerythritol and alpha-methylglucoside.

5. Flexible polyurethane foams according to claim 4 wherein the polyesters are formed by reacting the reactants at a temperature of about 100° to 300° C.

6. Flexile polyurethane foams according to claim 5 wherein the reactants are reacted in the presence of about 5 parts per million to about 0.3 percent of the total charge of a catalyst selected from the group consisting of polyesterification catalysts and ester interchange catalysts.

7. Flexible polyurethane foams according to claim 1 wherein the polyester contains about 30 percent by weight to about 70 percent by weight of the oxycaproyl unit

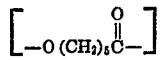

and is the reaction product of about 30 to 70 percent of epsilon-caprolactone and about 70 to 30 percent of a mixture comprising adipic acid, diethylene glycol and about 0.1 to 5.0 percent of trimethylol propane.

8. Flexible polyurethane foams according to claim 1 wherein the liquid polyesters (a) containing the epsilon-oxycaproyl unit

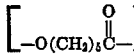

are prepared by the reaction of about 12 to 80 percent of a mixture of 6-hydroxycaproic acid and its lower oligomers with the remainder being a component of a dicarboxylic acid or its corresponding anhydride, an alkylene glycol and from about 0.1 to 5 percent based on the total charge of reactants in the polyester reaction, of a polyol branching agent.

9. Flexible polyurethane foams according to claim 8 wherein the polyester is the reaction product of about 12 to 80 percent of a mixture of 6-hydroxycaproic acid and its lower oligomers and the remainder a polymer segment comprising adipic acid, diethylene glycol and about 0.1 to about 5.0 percent of trimethylol propane.

10. Flexible polyurethane foams according to claim 4 wherein the organic polyisocyanate (b) is an organic diisocyanate selected from the group consisting of 2,4- and 2,6-toluene diisocyanate and mixtures thereof, diphenylmethane diisocyanates, polymeric isocyanates of condensation products of formaldehyde and aniline or orthotoluidine and mixtures of diphenylmethane diisocyanates with their carbodiimides.

11. Flexible polyurethane foams according to claim 10 wherein the blowing agent (c) is selected from the group consisting of water, mixtures of water with halogenated aliphatic hydrocarbons and mixtures of water with low boiling hydrocarbons.

12. Flexible polyurethane foams according to claim 11 wherein the catalyst (d) is a tertiary amine.

13. Flexible polyurethane foams according to claim 11 wherein the surfactant (e) is a siloxane-oxyalkylene copolymer containing about 15 to 30 percent by weight of the polysiloxane and the polyester contains from about 35 to 72% of the epsilonoxy-caproyl unit.

14. Flexible polyurethane foams according to claim 13 wherein the siloxane-oxyalkylene copolymer surfactant is selected from the group consisting of linear copolymers of polymeric alkylene oxides and polymeric dimethylsiloxanes, branched block copolymers of polymeric alkylene oxides and polymeric dimethylsiloxanes and homopolymers of ethylene oxide with polymeric dimethylsiloxane.

15. Flexible polyurethane foams according to claim 14 wherein the surfactant is of the formula:

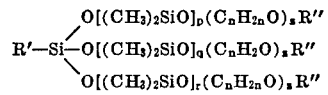

wherein $p+q+r$ have a minimum value of 4, $n$ is an integer of 2 to 4, $z$ is an integer averaging at least about 18, and R' and R" are hydrocarbyl 16. Flexible polyurethane foams according to claim 11 wherein the polyester contains from about 10 to 25% of the epsilon-oxycaproyl unit and the surfactant (e) is selected from the group consisting of polyoxypropylene-polyoxyethylene copolymers, nonylphenol-ethylene oxide adducts, alkoxy silanes, polysilylphosphonates, polydimethlysiloxanes, metal soaps and alkali metal sulfonates.

17. Flexible polyurethane foams according to claim 11 wherein the polyester contains from about 12 to 23% of the epsilon-oxycaproyl unit.

References Cited

UNITED STATES PATENTS

| | | | |
|---|---|---|---|
| 3,591,561 | 7/1971 | Kazama et al. | 260—77.5 AN |
| 3,186,971 | 6/1965 | Hostettler et al. | 260—77.5 |
| 3,663,515 | 5/1972 | Hostettler et al. | 260—77.5 AN |
| 3.226,368 | 12/1965 | Reischl et al. | 260—75 |
| 3,072,582 | 1/1963 | Frost | 260—2.5 |
| 2,977,385 | 3/1961 | Fowler et al. | 260—475 |
| 3,658,761 | 4/1972 | Hostettler et al. | 260—77.5 AN |
| 3,179,636 | 4/1965 | Convery | 260—78.3 |

H. S. COCKERAM, Primary Examiner

U.S. Cl. X.R.

260—2.5 BF, 77.5 AN, 858